United States Patent
Young (10) Patent No.: US 10,948,934 B1
(45) Date of Patent: Mar. 16, 2021

(54) VOLTAGE REGULATOR WITH PIECEWISE LINEAR LOADLINES

(71) Applicant: Alpha and Omega Semiconductor (Cayman) Limited, Grand Cayman (KY)

(72) Inventor: Chris M. Young, Round Rock, TX (US)

(73) Assignee: Alpha and Omega Semiconductor (Cayman) Limited, Grand Cayman (KY)

( * ) Notice: Subject to any disclaimer, the term of this patent is extended or adjusted under 35 U.S.C. 154(b) by 0 days.

(21) Appl. No.: 16/678,916

(22) Filed: Nov. 8, 2019

(51) Int. Cl.
| | |
|---|---|
| H02M 3/156 | (2006.01) |
| H02M 1/00 | (2006.01) |
| G06F 1/32 | (2019.01) |
| G05F 1/56 | (2006.01) |
| G06F 1/26 | (2006.01) |

(52) U.S. Cl.
CPC .............. G05F 1/56 (2013.01); G06F 1/26 (2013.01); H02M 3/156 (2013.01)

(58) Field of Classification Search
CPC ......... H02M 3/156; H02M 2001/0009; H02M 2001/0019; H02M 2001/0029; G06F 1/32–3296; G05F 1/56
See application file for complete search history.

(56) References Cited

U.S. PATENT DOCUMENTS

| | | | |
|---|---|---|---|
| 6,566,848 B2 | 5/2003 | Horigan et al. | |
| 6,995,549 B2 * | 2/2006 | Walters | H02M 3/156 323/273 |
| 7,080,268 B2 | 7/2006 | Mosley | |
| 7,642,764 B2 | 1/2010 | Burton et al. | |
| 8,402,294 B2 | 3/2013 | Burton | |
| 8,674,674 B1 * | 3/2014 | Abu Qahouq | H02M 3/158 323/283 |
| 9,213,381 B2 | 12/2015 | Osborn et al. | |
| 10,108,252 B2 * | 10/2018 | Zhang | G06F 1/3296 |

(Continued)

OTHER PUBLICATIONS

Todd Langley, Intel® architecture Platform Basics, Intel Corporation White Paper, Sep. 2010, 12 pages, United States.

(Continued)

*Primary Examiner* — Thienvu V Tran
*Assistant Examiner* — Sisay G Tiku
(74) *Attorney, Agent, or Firm* — Craige Thompson; Thompson Patent Law (57) ABSTRACT

Apparatus and associated methods relate to providing a piecewise loadline having a number of segments with different slopes and selecting a segment of the piecewise loadline based on an output current of a power supply. In an illustrative example, the piecewise loadline may include a segment that has a negative slope. When the output current is less than a predetermined threshold, the segment with the negative slope may be selected to improve power efficiency. In some embodiments, the piecewise loadline may have several segments with different positive slopes. Different segments may be selected to make the load work in different modes. For example, by selecting an overcurrent loadline, the load (e.g., a processor) may be informed to throttle back its performance. Having a piecewise loadline may allow independent optimization of the loadline resistances, voltage thresholds, and current limits.

18 Claims, 6 Drawing Sheets

(56) References Cited

U.S. PATENT DOCUMENTS

| | | | | |
|---|---|---|---|---|
| 2001/0045815 | A1* | 11/2001 | Muratov | G06F 1/32 323/280 |
| 2003/0137787 | A1* | 7/2003 | Kumar | H02M 3/156 361/18 |
| 2005/0149770 | A1 | 7/2005 | Koertzen et al. | |
| 2005/0154931 | A1* | 7/2005 | Oh | G06F 1/3203 713/300 |
| 2005/0270005 | A1* | 12/2005 | Horner | H02M 3/156 323/283 |
| 2009/0327776 | A1* | 12/2009 | Nguyen | H02M 3/1588 713/320 |
| 2011/0089914 | A1* | 4/2011 | Hartman | G06F 1/26 323/234 |
| 2017/0149335 | A1* | 5/2017 | Morroni | H02M 3/156 |
| 2018/0060085 | A1 | 3/2018 | Ananthakrishnan et al. | |
| 2019/0305674 | A1* | 10/2019 | Liu | H02M 1/00 |

OTHER PUBLICATIONS

Kris Boughton, Overclocking Intel's New 45nm QX9650: The Rules Have Changed, AnandTech, Dec. 19, 2007, [online], [retrieved on Oct. 1, 2019]. Retrieved from the Internet <https://www.anandtech.com/show/2404/5>.

ISL95712 Multiphase PWM Regulator for AMD Fusion™ Desktop CPUs Using SVI 2.0, Renesas Datasheet, Nov. 2, 2015, Rev 1.00, 35 pages, United States.

Noah Sturcken, Michele Petracca, Steven Warren, Paolo Mantovani, Luca P. Carloni, Angel V. Peterchev, and Kenneth L. Shepard, A Switched-Inductor Integrated Voltage Regulator With Nonlinear Feedback and Network-on-Chip Load in 45 nm SOI, IEEE Journal of Solid-State Circuits, vol. 47, No. 8, Aug. 2012, 11 pages, United States.

\* cited by examiner

VOLTAGE REGULATOR WITH PIECEWISE LINEAR LOADLINES

TECHNICAL FIELD

Various embodiments relate generally to voltage regulators.

BACKGROUND

Electronic devices, which may also be referred to as loads, receive power from a variety of electrical power sources. For example, some power sources may be coupled to a load device at a wall outlet (e.g., from a mains source) or may couple more directly to various local and/or portable sources (e.g., batteries, renewable energy sources, generators). Some load devices, such as central processing units (CPU) and graphics processors (GPU), continue to develop higher input current requirements while demanding tight voltage regulation and/or high efficiency from the power source.

In some electronic devices, the source voltage supply (e.g., battery input, rectified mains supply, intermediate DC supply) may be converted to a load compatible voltage by various voltage conversion circuits. Switch-mode power supplies have gained popularity as voltage conversion circuits due to their high efficiency and therefore are often used to supply a variety of electronic loads.

Switch-mode power supplies convert voltages using switching devices that turn on with very low resistance and turn off with very high resistance. Switch-mode power supplies may charge an output inductor during a period of time and may release part or all of the inductor energy during a subsequent period of time. The output energy may be delivered to a bank of output capacitors, which provide the filtering to produce a DC output voltage. In buck-derived switch-mode power supplies, the output voltage, in a steady state, may be approximately the input voltage times a duty cycle, where the duty cycle is the duration of the on-time of a pass switch divided by the total on-time and off-time of the pass switch for one switching cycle.

SUMMARY

Apparatus and associated methods relate to providing a piecewise loadline having a number of segments with different slopes and selecting a segment of the piecewise loadline based on an output current of a power supply. In an illustrative example, the piecewise loadline may include a segment that has a negative slope. When the output current is less than a predetermined threshold, the segment with the negative slope may be selected to improve power efficiency. In some embodiments, the piecewise loadline may have several segments with different positive slopes. Different segments may be selected to make the load work in different modes. For example, by selecting an overcurrent loadline, the load (e.g., a processor) may be informed to throttle back its performance. Having a piecewise loadline may allow independent optimization of the loadline resistances, voltage thresholds, and current limits.

Various embodiments may achieve one or more advantages. For example, when the load includes a processor (e.g., a multi-core processor), by monitoring the output current of the power supply, the processor may be signaled that it is drawing too much power. In some embodiments, by implementing a piecewise loadline, communication of transient high current events may be faster than the event such that the processor may perform some operations to prevent the event from happening to improve the system and/or transistor reliabilities.

Some implementations may advantageously reduce or substantially avoid excess energy flow into the load, which may improve the reliability and performance of the load. In some embodiments, by setting another threshold, the processor may be protected, for example, from a power virus. That is, when the output current is greater than the threshold, a possible reason is the processor is under attack by hackers or malicious code. By selecting a loadline that can make the output voltage of the power supply drop quickly, the processor may be then throttled to counter the attack. By making a piecewise loadline with a steep segment, a voltage regulator controller may mimic a constant current control when the current threshold is reached. Thus, constant current operation may be achieved by a simple change in the slope of the loadline. An effective, low cost and efficient means of signaling the processor may be obtained.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
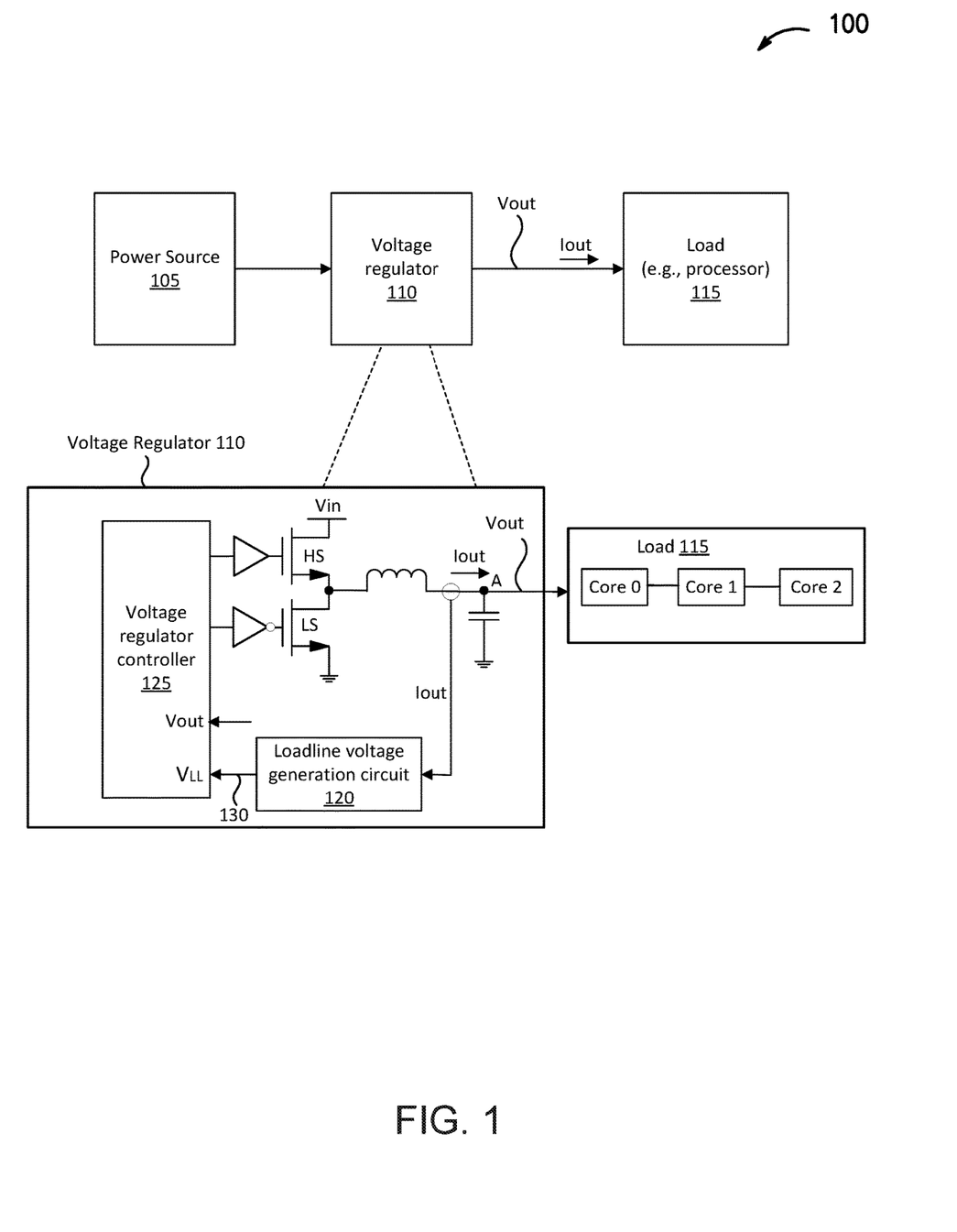
FIG. 1 depicts a block diagram of an exemplary voltage regulator that is coupled to power a load, where the voltage regulator has characteristics that comply with a piecewise loadline.

To aid understanding, this document is organized as follows. First, FIG. 1 depicts an exemplary power supply configured to power a load, and the power supply has characteristics that comply with a piecewise loadline. Second, with reference to FIGS. 2-4, the discussion turns to exemplary embodiments that illustrate different piecewise loadlines. Then, with reference to FIG. 5, an exemplary circuit used to select different loadlines of the piecewise loadline is discussed. Finally, with reference to FIG. 6, further discussion is presented to explain an exemplary method to operate the power supply.

DC-to-DC voltage conversion is often performed by switch-mode voltage regulators, also referred to as voltage converters or point-of-load (POL) regulators/converters. One type of DC-to-DC converter, called a buck or step-down regulator, may convert a higher voltage (e.g., 12V) to a lower value as required by one or more load devices. More generally, voltage regulators and current regulators are commonly referred to as power converters, and as used herein, the term power converter is meant to encompass such devices.

FIG. 1 depicts a block diagram of an exemplary voltage regulator that is coupled to power a load, where the voltage regulator has characteristics that comply with a piecewise loadline. A loadline of a voltage regulator may be defined as a line that represents the load current for different values of load voltages. In this depicted example, a system 100 includes a power source (e.g., one or more battery packs) 105 and a voltage regulator 110 configured to regulate or control an unregulated input voltage (e.g., voltage supplied by the power source 105) to a regulated output voltage $V_{out}$ at an output node A to power a load 115. The load 115 may include one or more components of a computing system (e.g., core rail of a processor). The voltage regulator 110 includes a loadline voltage generation circuit 120 configured to select different portions of a piecewise loadline as a function of a current sensed at the output node A and generate a setting signal 130 (e.g., voltage droop $V_{LL}$). An exemplary architecture of the loadline voltage generation circuit 120 is described in further detail with reference to FIG. 5. By selecting different slopes (different resistances) of the piecewise loadline in response to the current at the output node A, the voltage regulator 110 may be made to respond quickly to deviations from a setpoint voltage (both voltage droops and voltage spikes), and the load 115 may be informed that the load 115 is drawing too much current. The load 115 may then throttle back its performance to match the power delivery capability of the voltage regulator 110.

The voltage regulator 110 may also employ N-channel metal-oxide-semiconductor field-effect-transistors (NMOS-FETs) or other types of transistors as power stages. The voltage regulator 110 also includes an inductor with one terminal of the inductor is coupled to the power stage. The voltage regulator 110 also includes a capacitor coupled to the other terminal of the inductor through the output node A. An output voltage $V_{OUT}$ at the output node A is then received by the loads 115.

In this depicted example, the voltage regulator 110 includes a voltage regulator controller 125 configured to cause the voltage regulator 110 to produce regulated output voltages $V_{out}$. The voltage regulator controller 125 is configured to receive a reference voltage $V_{ref}$, the output voltage $V_{OUT}$, and the setting signal 130 to generate and/or adjust a pulse-width-modulated (PWM) signal PWM_IN. The PWM_IN signal is used to control the power stage.

In some embodiments, as the load 115 may include one or more processors, the processor may be informed that it is drawings too much current. The processor may be then configured to throttle back its performance to, for example, match the power delivery capability of the voltage regulator. For example, a core of a multi-core processor may be shut off, or the core's clock frequency may be reduced. The piecewise loadline may be used to adjust the voltage at the output node as output current changes. For example, when the output current is above a predetermined threshold, a loadline having a smaller slope may be changed to a loadline having a larger slope to reduce the output voltage quickly. Exemplary loadlines are shown with references to FIGS. 2-4.

Figure 2:
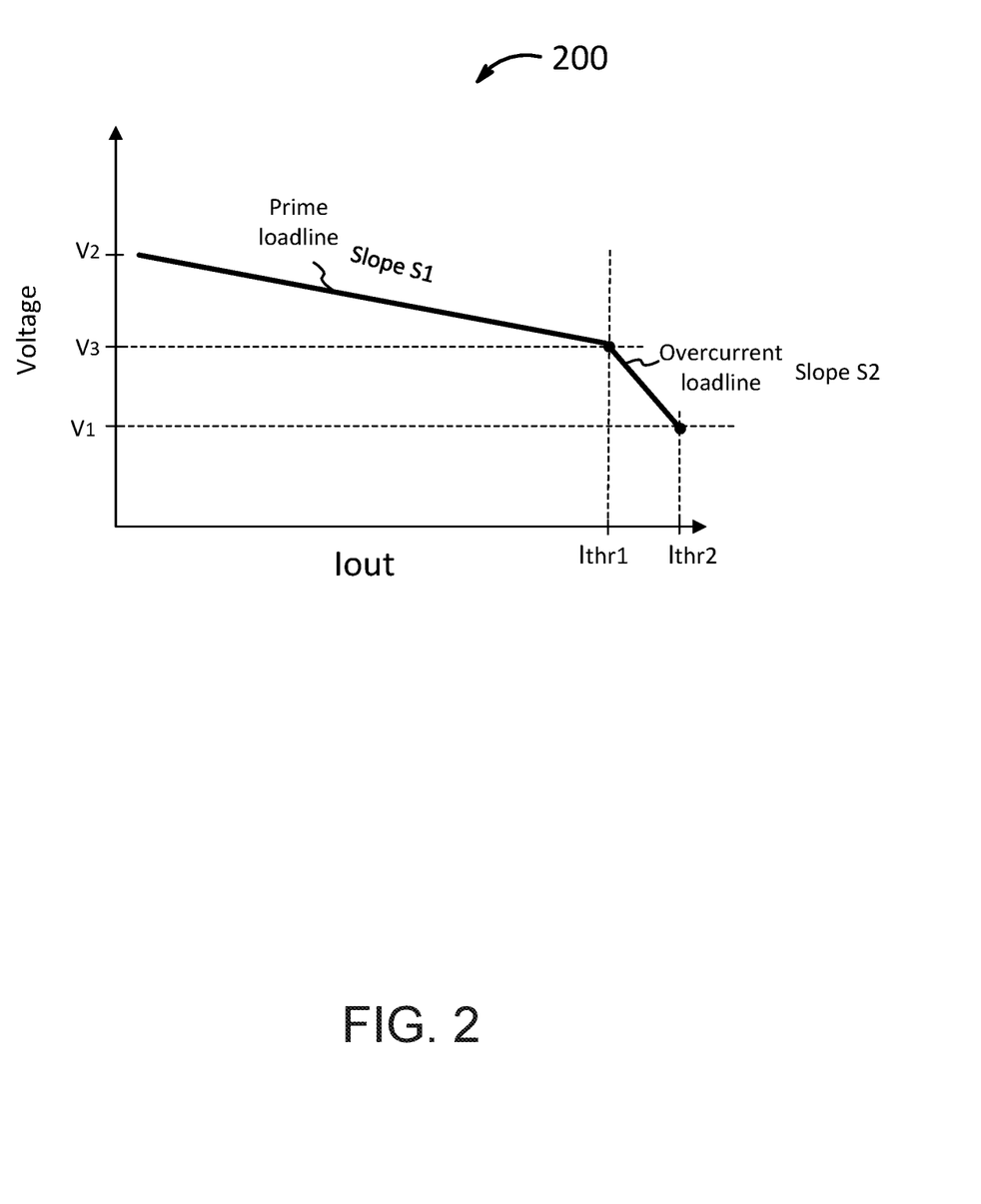
FIG. 2 depicts an exemplary piecewise loadline.

FIG. 2 depicts an exemplary piecewise loadline. The voltage regulator 110 may have a piecewise loadline 200 that ranges from a first load (e.g., processor) voltage limit $V_1$ (e.g., a lower processor voltage limit) and a second load voltage limit $V_2$ (a higher processor voltage limit), as a function of output current $I_{out}$, from a second output current limit $I_{thr2}$ (e.g., a higher output current limit) to a first current limit $I_{thr1}$ (e.g., a lower output current limit) and then down to zero current, respectively. As shown in FIG. 2, the piecewise loadline 200 includes a first loadline called prime loadline, and a second loadline called overcurrent loadline. The prime loadline, having a first slope S1, lies between zero and the first current limit $I_{thr1}$ and between a third load voltage limit $V_3$ and the second load voltage limit $V_2$. The overcurrent loadline, having a second slope S2, lies between the first current limit $I_{thr1}$ and the second current limit $I_{thr2}$, and between the first load voltage limit $V_1$ and the third voltage limit $V_3$. The first slope S1 is smaller than the second slope S2. This piecewise linear loadline may advantageously provide independent settings of the loadline slopes for each segment as well as independently controlled transition points.

When the output current is greater than the first current limit $I_{thr1}$, the slope of the piecewise loadline 200 is changed from slope S1 to slope S2. For example, when the output current reaches a predetermined value (e.g., the first lower current limit $I_{thr1}$) that represents maximum power, the loadline of the voltage regulator may be changed from the prime loadline into the overcurrent loadline, such that the output voltage may fall quickly, which will trigger the alert that the processor is drawings too much power. The processor may have the ability to sense that its own input voltage is below a certain level and may understand that the processor may need to throttle back its performance. For example, for a multi-core processor, a core may be shut off, or the clock frequency of one or more cores may be decreased. If the performance is not throttled back, the processor may keep demanding power from the supply.

In some embodiments, the overcurrent loadline may be used when the value of $I_{thr1}$ is set relative to a current limit of an input power supply. $V_1$ may be set by the load as the threshold at which it shuts down or throttles back to reduce the load current. The slope of the overcurrent loadline may be set to achieve a desired response. As an example, an input power supply may have a limit of 200 A ($I_{thr1}$). $I_{thr2}$ may be set at 220 A to give a 10% cushion to account for noise and inaccuracies in the system. Characteristically, the voltage levels may be set according to the requirements of the load. In some embodiments, the prime loadline may be set for 1 mOhm, $I_{thr1}$ may be set at 200 A, then $V_3$ may be set at 1.6V.

Figure 3:
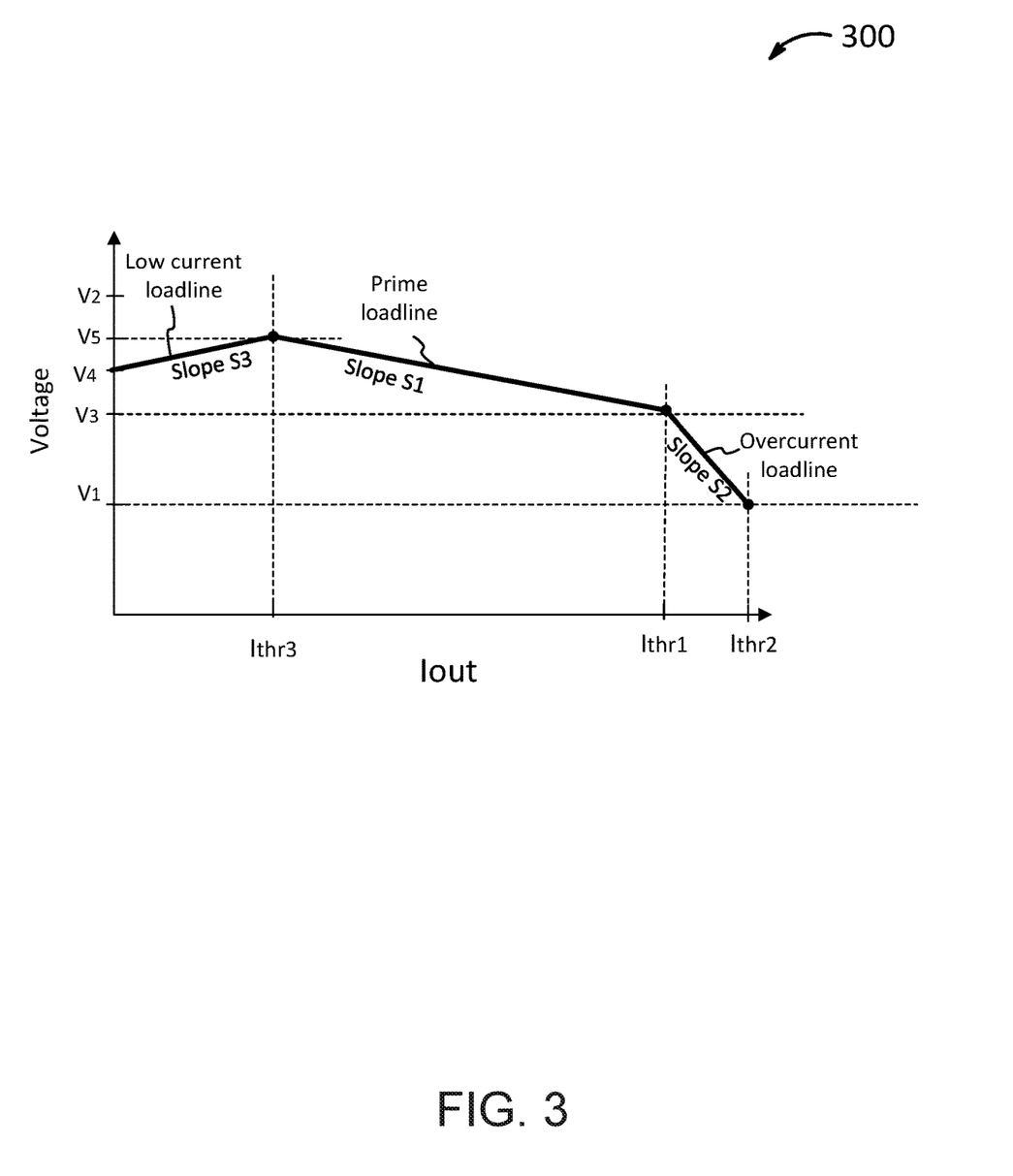
FIG. 3 depicts another exemplary piecewise loadline.

FIG. 3 depicts another exemplary piecewise loadline. In this depicted example, a piecewise loadline 300 implemented in the voltage regulator also includes a low current negative loadline having a slope S3 (e.g., negative resistance). The low current negative loadline lies between zero and a third current limit $I_{thr3}$, and between a fourth load voltage limit $V_4$ and a fifth load voltage limit $V_5$. As an example, some microprocessors may have a nominal input voltage of 1.8V. $V_5$ may be set at this level. When the output current is less than the third current limit $I_{thr3}$, the loadline of the voltage regulator may be changed from the prime loadline into the low current loadline, such that the output voltage doesn't go so high at low currents, which may result in less power losses. For example, the major parasitic losses for a processor may be resistor losses (e.g., shunt resistances) and capacitor losses (e.g., charge and discharge capacitors). By reducing the output voltage of the voltage regulator (e.g., input voltage of the processor), losses of power may be advantageously decreased to improve power efficiency.

Figure 4:
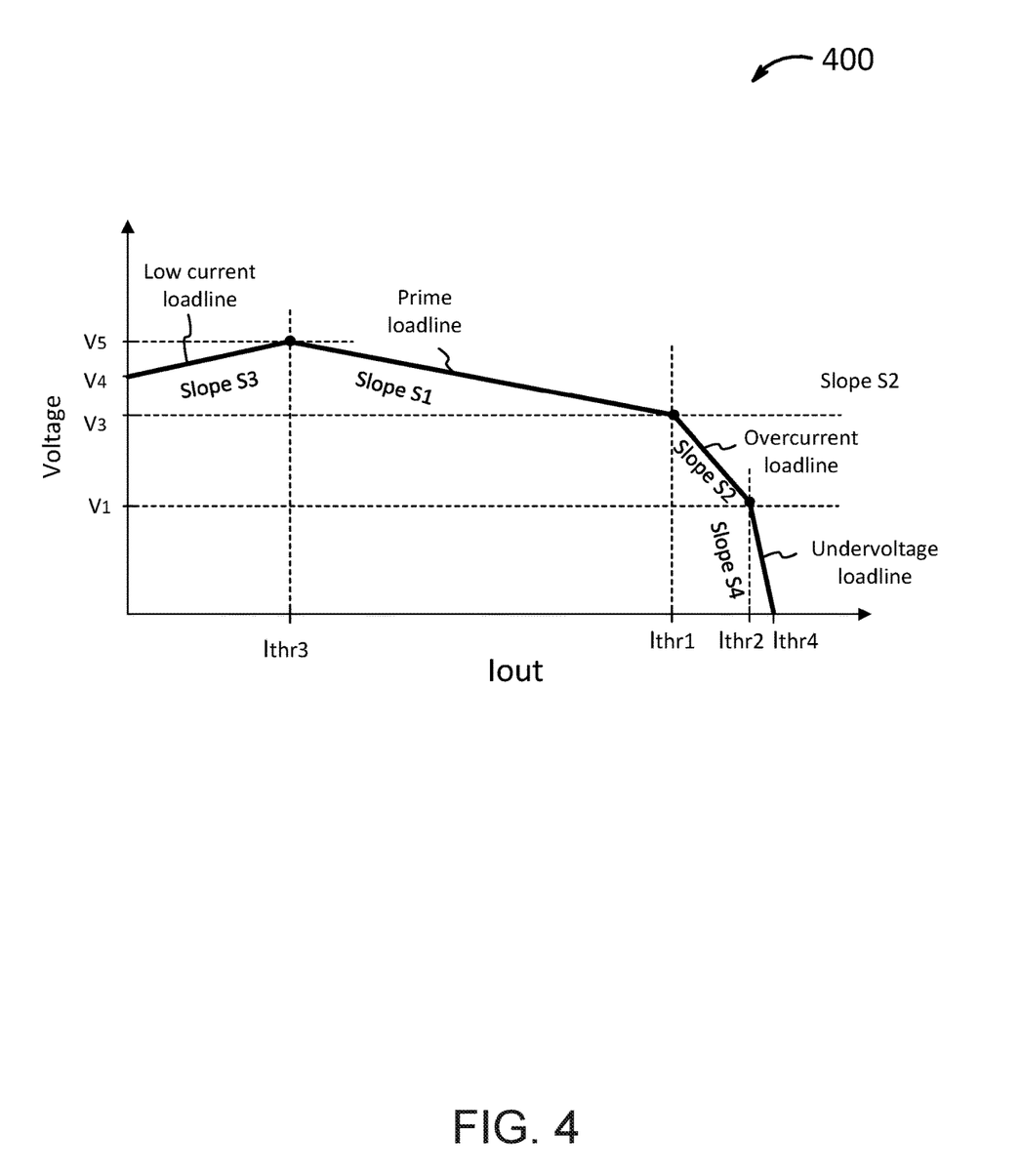
FIG. 4 depicts another exemplary piecewise loadline.

FIG. 4 depicts another exemplary piecewise loadline. In this depicted example, a piecewise loadline 400 implemented in the voltage regulator also includes an undervoltage loadline having a slope S4. The undervoltage loadline lies between the second current limit $I_{thr2}$ and a fourth current limit $I_{thr4}$, and between zero and the first voltage limit $V_1$. When the output current is greater than the second current limit $I_{thr2}$, the loadline of the voltage regulator may be changed from the overcurrent loadline into the undervoltage loadline such that the load (e.g., the processor) may be shut down. For example, a processor may be hacked, and a virus may be put in. The virus may turn on all of the transistors (which is not a regular operation of the processor), for example, to maximize the power and bring down the system. By reducing the output voltage quickly, the input voltage of the system may be very low to shut down the system to prevent the system from being hacked.

Figure 5:
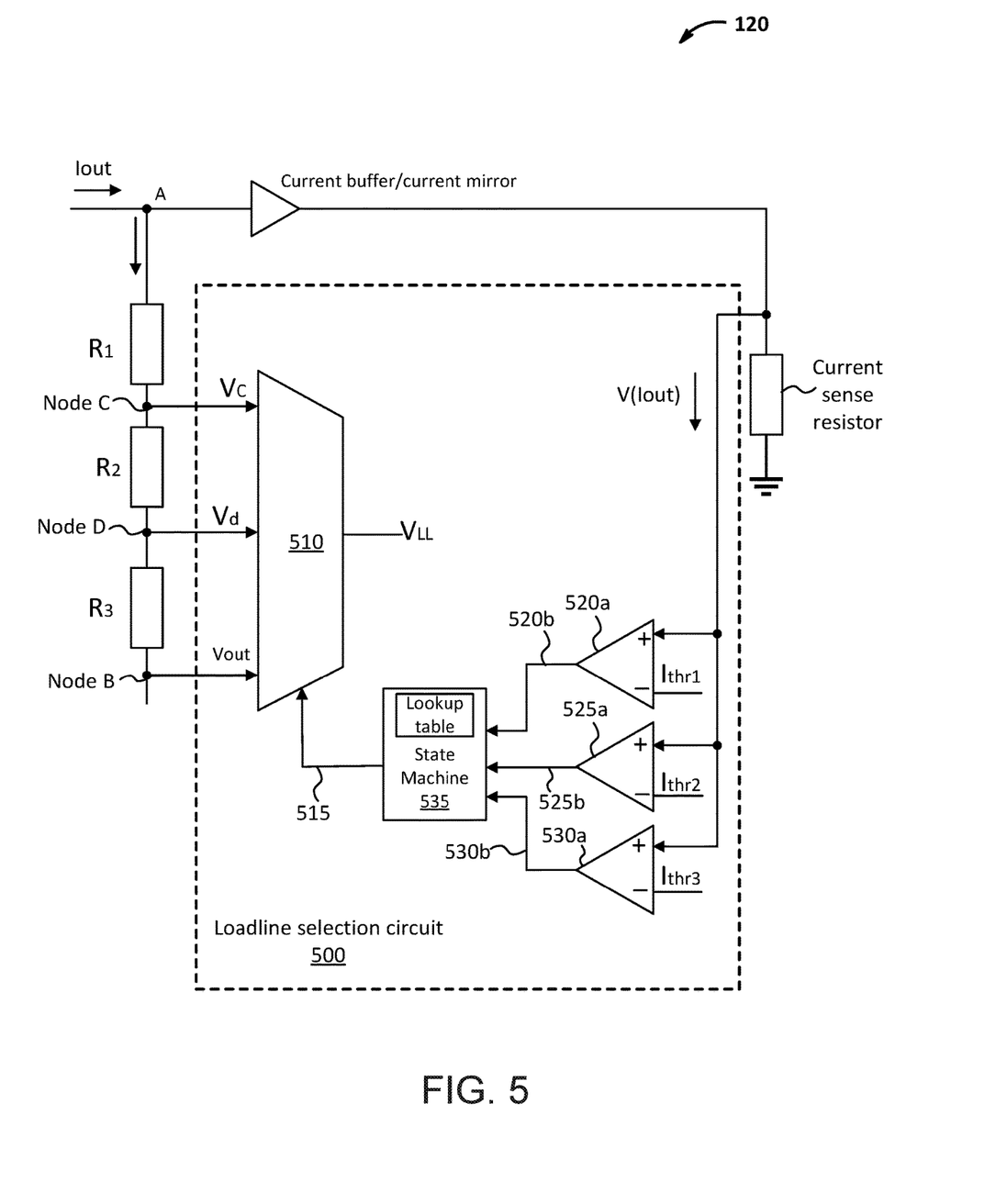
FIG. 5 depicts a block diagram of an exemplary loadline selection circuit used in the voltage regulator.

FIG. 5 depicts a block diagram of an exemplary loadline selection circuit used in the voltage regulator. In this depicted example, the loadline voltage generation circuit 120 includes a number of resistors (e.g., $R_1$, $R_2$, and $R_3$) connected in series. The string of resistors is coupled between node A and node B. Node A is connected to the measured output current $I_{out}$, and Node B is connected to the output voltage. In this depicted example, the resistor $R_1$ is placed between node A and node C, the resistor $R_2$ is placed between node C and node D, and the resistor R3 is placed between node D and node B. In some embodiments, the string of resistors may also include a negative resistor. A voltage at node B is defined as the output voltage $V_{out}$ of the voltage regulator.

The loadline voltage generation circuit 120 includes three sensing points (not shown) configured to sense the voltage at node C, node D, and node B. The sensed voltage $V_c$ at node C, sensed voltage $V_d$ at node D, and the sensed voltage $V_{out}$ at node B are then received by a three-input multiplexer 510.

$$V_c = V_{out} + I_{out} * (R_2 + R_3)$$

$$V_d = V_{out} + I_{out} * (R_3)$$

The three-input multiplexer 510 is configured to output a loadline voltage $V_{LL}$ in response to a selection signal 515. The loadline voltage $V_{LL}$ (and the resistance of the string of resistors) is selected as a function of the output current $I_{out}$. $V_{LL}$ is the voltage that is used by a control system (e.g., the voltage regulator controller) to represent the loadline adjusted output voltage. The control system may then drive the output so that $V_{LL}$ matches a reference voltage.

More specifically, to select different slopes of the piecewise loadline 400, in this depicted example, a loadline selection circuit 500 of the loadline voltage generation circuit 120 includes a first comparator 520a, a second comparator 525a, and a third comparator 530a. The first comparator 520a is configured to compare the sensed output current $I_{out}$ with the first current limit $I_{thr1}$ to generate a first comparison result 520b. The second comparator 525a is configured to compare the sensed output current $I_{out}$ with the second current limit $I_{thr2}$ to generate a second comparison result 525b. The third comparator 530a is configured to compare the sensed output current $I_{out}$ with the third current limit $I_{thr3}$ to generate a third comparison result 530b. A state machine 535 is coupled to the three comparators to receive the three comparison results and generate the selection signal 515.

For example, when the sensed output current $I_{out}$ is less than the second current limit $I_{thr2}$ and greater than the first current limit $I_{thr1}$, the state machine 535 may generate a selection signal to select a loadline given by $V_C$ (e.g., the overcurrent loadline with a slope S2) to make the output voltage $V_{out}$ decrease very quickly. In some embodiments, the state machine 535 may include a lookup table. By using the loadline selection circuit, the slope of a piecewise linear loadline in a power supply may be automatically selected.

Figure 6:
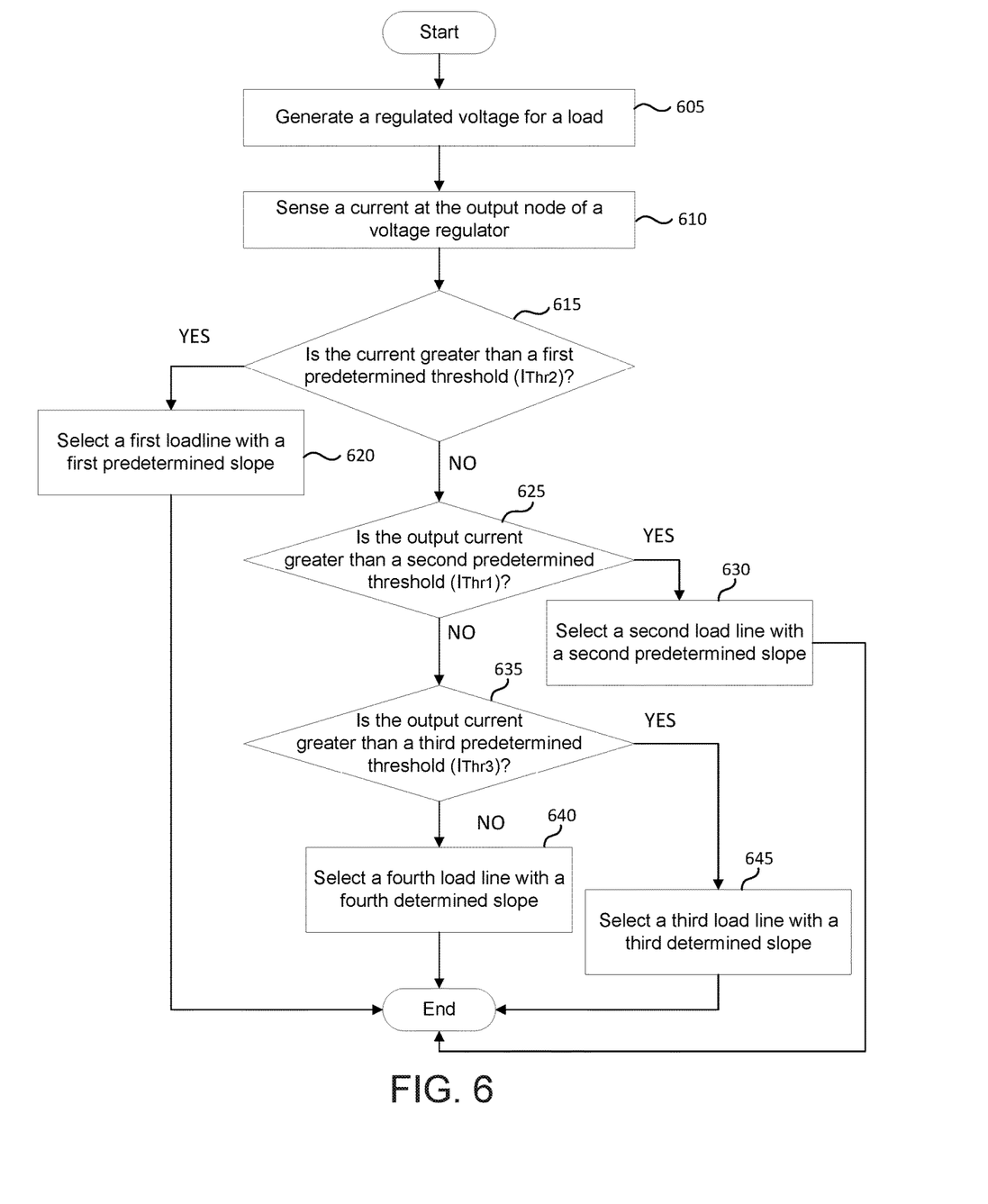
FIG. 6 depicts a flow chart of an exemplary method to operate the voltage regulator.

FIG. 6 depicts a flow chart of an exemplary method to operate the voltage regulator. An exemplary method 600 to operate the voltage regulator having the piecewise loadline 400 includes, at 605, generating (e.g., by the voltage regulator) a regulated voltage $V_{out}$ for a load (e.g., the load 115). The method 600 also includes, at 610, sensing an output current $I_{out}$ at an output node A of the voltage regulator.

The method 600 also includes, at 615, determining (e.g., by the comparator and state machine) whether the sensed output current $I_{out}$ is greater than the second current limit $I_{thr2}$. If the sensed output current $I_{out}$ is greater than the second current limit $I_{thr2}$, then, at 620, the undervoltage loadline with the fourth slope S4 is selected.

If the sensed output current $I_{out}$ is not greater than the second current limit 62, then, the method 600 also includes, at 625, determining (e.g., by the comparator and state machine) whether the sensed output current $I_{out}$ is greater than the first current limit $I_{thr1}$. If the sensed output current $I_{out}$ is greater than the first current limit $I_{thr1}$, then, at 630, the overcurrent loadline with the third slope S3 is selected.

If the sensed output current $I_{out}$ is not greater than the first current limit $I_{thr1}$, then, the method 600 also includes, at 635, determining (e.g., by the comparator and state machine) whether the sensed output current $I_{out}$ is greater than the third current limit $I_{thr3}$. If the sensed output current $I_{out}$ is not greater than the third current limit $I_{thr1}$, then, at 640, the low current loadline with the fourth slope S4 is selected. If the sensed output current $I_{out}$ is greater than the third current limit $I_{thr3}$, then, at 645, the prime loadline with the third slope S3 is selected. In other examples, various methods may be used to select a loadline in response to the sensed output current. For example, analog-to-digital converters (ADC) may be used to convert analog signals into digital signals, and the digital signals may be used to enable the multiplexer to generate a corresponding $V_{LL}$ signal. In some embodiments, the voltage regulator may have a different piecewise loadline (e.g., the loadline 200, the loadline 300), and the sequences of the method to select different slopes may be different.

Although various embodiments have been described with reference to the figures, other embodiments are possible. In various embodiments, a reference factor of triggering the change the slope of a piecewise loadline may be other parameters, rather than the output current of the voltage regulator. For example, the ambient temperature of the load may be used as a reference factor. When the ambient temperature arrives at a predetermined value, the slope of the loadline may be changed to advantageously reduce or substantially eliminate thermal issues. In some embodiments, the combination of different parameters (e.g., temperature, current, voltage, power) may be used as the reference factor.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits (e.g., FPGAs, ASICs), In some embodiments, the module(s) may involve execution of preprogrammed instructions and/or software executed by a processor. For example, various modules may involve both hardware and software.

In one exemplary aspect, a control circuit includes (a) an input terminal coupled to receive an output current signal representative of a current supplied by a voltage regulator to a load, (b) a processing circuit configured to generate a control output signal according to one of a plurality of predetermined loadline characteristics. The processing circuit is operative to select one of the plurality of predetermined loadline characteristics as a function of the received output current signal, and, (c) an output terminal to transmit the generated control output signal to a control input of the voltage regulator.

In some embodiments, at least one of the predetermined loadline characteristics may include a loadline characterized by a negative resistance at an output of the voltage regulator. In some embodiments, the processing circuit may be configured to select a loadline characterized by a negative resistance when the output current may be less than a first predetermined current threshold. In some embodiments, at least one of the predetermined loadline characteristics may include a first loadline characterized by a first positive resistance and a second loadline characterized by a second positive resistance, the second positive resistance may be greater than the first positive resistance, and when the output current may be greater than a second predetermined current threshold, the processing circuit may be configured to select the second loadline.

In some embodiments, when the output current may be greater than the first predetermined current threshold and less than the second predetermined threshold, the processing circuit may be configured to select the first loadline. In some embodiments, at least one of the predetermined loadline characteristics may include a first loadline characterized by a first positive resistance and a second loadline characterized by a second positive resistance, the second positive resistance may be greater than the first positive resistance, and when the output current may be greater than a second predetermined current threshold, the processing circuit may be configured to select the second loadline.

In some embodiments, the processing circuit may be further configured to select the first loadline when the output current may be less than the second predetermined current threshold. In some embodiments, at least one of the predetermined loadline characteristics may include a third loadline characterized by a third positive resistance, the third positive resistance may be greater than the second positive resistance, and when the output current may be greater than the second predetermined current threshold and less than the a third predetermined current threshold, the processing circuit may be configured to select the second loadline. In some embodiments, when the output current may be greater than the third predetermined current threshold, the processing circuit may be configured to select the third loadline.

In some embodiments, the processing circuit may include (a) a first comparator configured to receive the output current and a first predetermined current threshold to generate a first comparison result, (b) a state machine coupled to an output of the first comparator and generate a selection signal in response to the first comparison result, and, (c) a multiplexer configured to receive a plurality of voltage values sensed at different nodes of a string of resistors. The string of resistors may be coupled between a first node A and a second node B, the output current may be injected into the first node A, the second node B may be connected to a signal which represents an output voltage generated by the voltage regulator. The multiplexer may be configured to output the control output signal $V_{LL}$ in response to the selection signal.

In some embodiments, the control circuit may include the voltage regulator, and the voltage regulator comprising a switched-mode power stage. In some embodiments, the received output current signal may include an average over a plurality of switching cycles of the voltage regulator.

In another exemplary aspect, a method to operate a control circuit includes (a) receiving an output current signal representative of a current supplied by a voltage regulator to a load, (b) generating, with a processing circuit, a control output signal according to one of a plurality of predetermined loadline characteristics. The processing circuit is operative to select one of the plurality of predetermined loadline characteristics as a function of the received output current signal, and, (c) providing, to the voltage regulator, the generated control output signal. The voltage regulator is configured to control an output voltage of the voltage regulator in response to the control output signal.

In some embodiments, at least one of the predetermined loadline characteristics may include a loadline characterized by a negative resistance at an output of the voltage regulator. In some embodiments, the generation of the control output signal may include selecting a loadline characterized by a negative resistance when the output current may be less than a first predetermined current threshold. In some embodiments, at least one of the predetermined loadline characteristics may include a first loadline characterized by a first positive resistance and a second loadline characterized by a second positive resistance, the second positive resistance may be greater than the first positive resistance, the generation of the control output signal further comprises selecting the second loadline when the output current may be greater than a second predetermined current threshold.

In some embodiments, the generation of the control output signal may include selecting the first loadline when the output current may be greater than the first predetermined current threshold and less than the second predetermined threshold. In some embodiments, at least one of the predetermined loadline characteristics may include a first loadline characterized by a first positive resistance and a second loadline characterized by a second positive resistance, the second positive resistance may be greater than the first positive resistance, the generation of the control output signal may include selecting the second loadline when the output current may be greater than a second predetermined current threshold.

In some embodiments, the generation of the control output signal may include selecting the first loadline when the output current may be less than the second predetermined current threshold. In some embodiments, at least one of the predetermined loadline characteristics may include a third loadline characterized by a third positive resistance, the third positive resistance may be greater than the second positive resistance. The generation of the control output signal further comprises selecting the second loadline when the output current may be greater than the second predetermined current threshold and less than a third predetermined current threshold.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A control circuit comprising:
(a) an input terminal coupled to receive an output current signal representative of a current supplied by a voltage regulator to a load;
(b) a processing circuit configured to generate a control output signal according to one of a plurality of predetermined loadline characteristics, wherein the processing circuit is operative to select one of the plurality of predetermined loadline characteristics as a function of the received output current signal; and,
(c) an output terminal to transmit the generated control output signal to a control input of the voltage regulator;
wherein at least one of the predetermined loadline characteristics comprises a loadline characterized by a negative resistance at an output of the voltage regulator.

2. The control circuit of claim 1, wherein the processing circuit is configured to select the loadline characterized by the negative resistance when the output current is less than a first predetermined current threshold.

3. The control circuit of claim 2, wherein the at least one of the predetermined loadline characteristics further comprises a first loadline characterized by a first positive resistance and a second loadline characterized by a second positive resistance, the second positive resistance is greater than the first positive resistance, and when the output current is greater than a second predetermined current threshold, the processing circuit is configured to select the second loadline.

4. The control circuit of claim 3, wherein when the output current is greater than a first predetermined current threshold and less than the second predetermined current threshold, the processing circuit is configured to select the first loadline.

5. The control circuit of claim 1, further comprising the voltage regulator, and the voltage regulator comprising a switched-mode power stage.

6. A control circuit comprising:
(a) an input terminal coupled to receive an output current signal representative of a current supplied by a voltage regulator to a load;
(b) a processing circuit configured to generate a control output signal according to one of a plurality of predetermined loadline characteristics, wherein the processing circuit is operative to select one of the plurality of predetermined loadline characteristics as a function of the received output current signal; and,
(c) an output terminal to transmit the generated control output signal to a control input of the voltage regulator;
wherein at least one of the predetermined loadline characteristics further comprises a first loadline characterized by a first positive resistance and a second loadline characterized by a second positive resistance, the second positive resistance is greater than the first positive resistance, and when the output current is greater than a second predetermined current threshold, the processing circuit is configured to select the second loadline.

7. The control circuit of claim 6, wherein the processing circuit is further configured to select the first loadline when the output current is less than the second predetermined current threshold.

8. The control circuit of claim 6, wherein the at least one of the predetermined loadline characteristics further comprises a third loadline characterized by a third positive resistance, the third positive resistance is greater than the second positive resistance, and when the output current is greater than the second predetermined current threshold and less than a third predetermined current threshold, the processing circuit is configured to select the second loadline.

9. The control circuit of claim 8, wherein when the output current is greater than the third predetermined current threshold, the processing circuit is configured to select the third loadline.

10. A control circuit comprising:
(a) an input terminal coupled to receive an output current signal representative of a current supplied by a voltage regulator to a load;
(b) a processing circuit configured to generate a control output signal according to one of a plurality of predetermined loadline characteristics, wherein the processing circuit is operative to select one of the plurality of predetermined loadline characteristics as a function of the received output current signal; and,
(c) an output terminal to transmit the generated control output signal to a control input of the voltage regulator;
wherein the processing circuit comprises:
(a) a first comparator configured to receive the output current and a first predetermined current threshold to generate a first comparison result;
(b) a state machine coupled to an output of the first comparator and generate a selection signal in response to the first comparison result; and,
(c) a multiplexer configured to receive a plurality of voltage values sensed at different nodes of a string of resistors, wherein the string of resistors is coupled between a first node A and a second node B, wherein the output current is injected into the first node A, the second node B is connected to a signal which represents an output voltage generated by the voltage regulator, wherein the multiplexer is configured to output the control output signal $V_{LL}$ in response to the selection signal.

11. A control circuit comprising:
(a) an input terminal coupled to receive an output current signal representative of a current supplied by a voltage regulator to a load;
(b) a processing circuit configured to generate a control output signal according to one of a plurality of predetermined loadline characteristics, wherein the processing circuit is operative to select one of the plurality of predetermined loadline characteristics as a function of the received output current signal; and,
(c) an output terminal to transmit the generated control output signal to a control input of the voltage regulator;
wherein the received output current signal comprises an average over a plurality of switching cycles of the voltage regulator.

12. A method to operate a control circuit, the method comprising:
receiving an output current signal representative of a current supplied by a voltage regulator to a load;
generating, with a processing circuit, a control output signal according to one of a plurality of predetermined loadline characteristics, wherein the processing circuit is operative to select one of the plurality of predetermined loadline characteristics as a function of the received output current signal; and,
providing, to the voltage regulator, the generated control output signal, wherein the voltage regulator is configured to control an output voltage of the voltage regulator in response to the control output signal;
wherein at least one of the predetermined loadline characteristics comprises a loadline characterized by a negative resistance at the output of the voltage regulator.

13. The method of claim 12, wherein the generation of the control output signal comprises: selecting the loadline characterized by the negative resistance when the output current is less than a first predetermined current threshold.

14. The method of claim 13, wherein the at least one of the predetermined loadline characteristics further comprises a first loadline characterized by a first positive resistance and a second loadline characterized by a second positive resistance, the second positive resistance is greater than the first positive resistance, the generation of the control output signal further comprises selecting the second loadline when the output current is greater than a second predetermined current threshold.

15. The method of claim 14, wherein the generation of the control output signal further comprises selecting the first loadline when the output current is greater than the first predetermined current threshold and less than the second predetermined current threshold.

16. A method to operate a control circuit, the method comprising:
receiving an output current signal representative of a current supplied by a voltage regulator to a load;
generating, with a processing circuit, a control output signal according to one of a plurality of predetermined loadline characteristics, wherein the processing circuit is operative to select one of the plurality of predetermined loadline characteristics as a function of the received output current signal; and,
providing, to the voltage regulator, the generated control output signal, wherein the voltage regulator is configured to control an output voltage of the voltage regulator in response to the control output signal;
wherein at least one of the predetermined loadline characteristics further comprises a first loadline characterized by a first positive resistance and a second loadline characterized by a second positive resistance, the second positive resistance is greater than the first positive resistance, wherein the generation of the control output signal further comprises selecting the second loadline when the output current is greater than a second predetermined current threshold.

17. The method of claim 16, wherein the generation of the control output signal further comprises selecting the first loadline when the output current is less than the second predetermined current threshold.

18. The method of claim 17, wherein the at least one of the predetermined loadline characteristics further comprises a third loadline characterized by a third positive resistance, the third positive resistance is greater than the second positive resistance, wherein the generation of the control output signal further comprises selecting the second loadline when the output current is greater than the second predetermined current threshold and less than a third predetermined current threshold.

* * * * *